Feb. 4, 1969
G. ROSELMAN
3,425,213
CHAIN CUTTER AND ASSEMBLY APPARATUS
Filed April 20, 1964
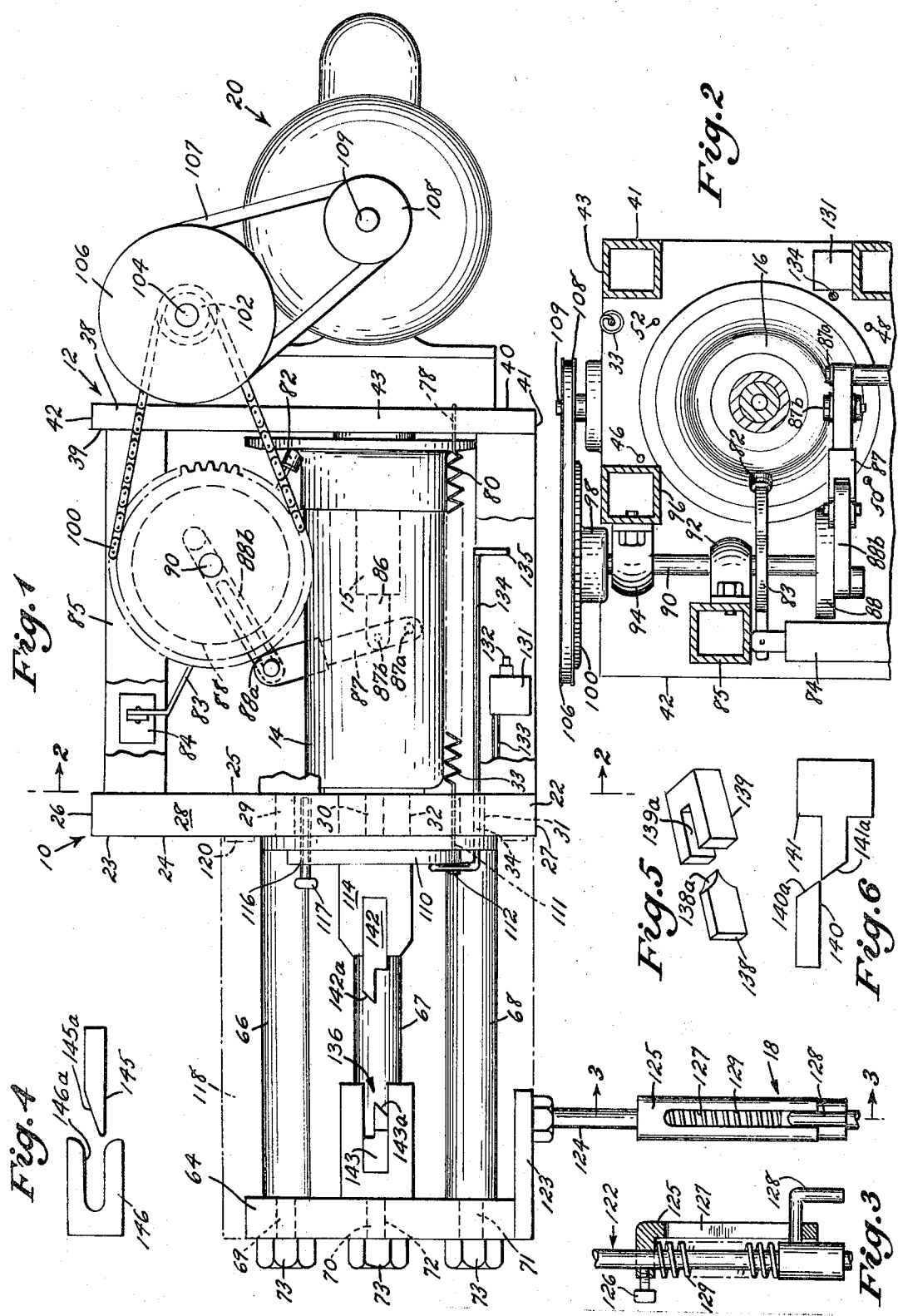

United States Patent Office
3,425,213
Patented Feb. 4, 1969

3,425,213
CHAIN CUTTER AND ASSEMBLY APPARATUS
Gary Roselman, Liberty, N.Y., assignor to Albert Monash, Bronx, N.Y.
Filed Apr. 20, 1964, Ser. No. 361,059
U.S. Cl. 59—11     5 Claims
Int. Cl. B21l 5/00, 11/00; B26d 5/12

This invention relates generally to a chain cutter and assembly apparatus, and more particularly to such apparatus for use in commercial applications, such as snow removal operations, where chains placed on tires of snow plows and removal trucks, wear rapidly.

Snow removal operations, as handled by municipal highway departments, cause rapid wear per unit time of use. Because of this wear chains used in the tire sets are purchased in continuous lot lengths and assembled by the department employees. The chain is purchased in two different sizes: a cross chain size for the tread surface of the tire, and a side chain size laying circumferentially near the side periphery of the tire and to which the cross chains are secured. Since the cross chains wear out about five times as fast as the side chains, they must be removed, new cross chains cut to size, and secured to the side chains. Since there are between thirteen to fourteen cross chains per tire, the particular operation is performed many times. It should be noted that both the cross chains and the side chains must be cut to specific length.

The present method of effectuating assembly and servicing commercial snow chains dates back approximately forty years, or to the inception of the use of chains on the tires of snow removal vehicles. The chains are cut from one hundred foot barrel rolls by the use of bolt cutters or by acetylene torch. The bolt cutter is equipped with three foot long handles and shears the chain. This method is very slow, and for a ⅜-inch chain each cut requires a man exerting a force of 100–150 pound force. The acetylene torch method is also very slow and dangerous, and is quite expensive.

After the chains have been cut to size, the cross chains are secured to the side chains by a chain hook which is passed through the end links of the cross chains with the hooked portion positioned around the elongated portions of the side chain links and pressed into secured engagement therewith. This is accomplished by a pair of pliers having elongated handles, and again through exertion of a large force.

When the cross chain wear out, another tool, shaped like an ice tong, is employed to pry the hooked portions of the chain hook loose from the side chain, and the entire operation is then repeated.

This present method of assembling and servicing the chains involves the rather extensive physical labor of two men for five to six hours just to remove the old cross chains, cut new ones, and secure them with cross chain hooks.

Accordingly, it is among the principal objects of the present invention to provide a device of the character described which will eliminate the inordinate physical exertion now required and significantly reduce the amount of time required.

The present invention contemplates a small, portable unit comprising a ram, such as a hydraulic ram powered by a motor and actuated by a switch. The head actuated by the ram may interchangeably receive a cutting die set, a pressing set, and an opening set. There is a length adjustment element adjacent the head so the measurement of a desired length of chain may be accomplished with a minimum of effort. As each step of the assembly or servicing operation is effectuated, the appropriate tool set is positioned in the ram head and operatively adjacent thereto. The entire operation can be completed by one man in approximately one and one-half hours.

A further object of the present invention is to provide a chain cutter and assembly apparatus which will cut hard and soft chain to length, open and close cross chain hooks, and assemble cross and side chains into a finished tire chain.

Another object of the present invention lies in the provision of a chain cutter and assembly apparatus in which the cost of fabrication may be of a relatively low order, thereby permitting consequent wide sale, distribution, and use.

A feature of the invention lies in the provision of an adjustable chain measurement element to allow rapid, yet simple and accurate means to lay out a desired length of chain for cutting.

These objects and features, as well as other incidental ends and advantages, will more fully appear in the progress of this disclosure, and be pointed out in the appended claims.

In the drawings, to which reference will be made in the specification, similar reference characters have been employed to designate corresponding parts throughout the several views.

Other objects, features, and advantages will become apparent to those skilled in the art upon careful consideration of the following detailed description of a preferred embodiment of the invention taken in conjunction with the accompanying drawings in which:

FIGURE 1 is a top plan view, partially fragmented, of an embodiment of the invention.

FIGURE 2 is a cross sectional view as seen from the plane 2—2 on FIGURE 1.

FIGURE 3 is a side elevational view of the chain link guide.

FIGURE 4 is a view of the tools, utilized in the closing operation.

FIGURE 5 is a perspective view of the soft metal cutting tools.

FIGURE 6 is a top plan view of the prying tools.

In accordance with an embodiment of the invention, the unit 10 comprises broadly a frame 12, an hydraulic ram 14 and pump 15, a ram drive 16, a measurement member 18, and power means 20.

More particularly the frame 12 includes a front plate 22 defined by a bottom wall 23, a front wall 24, a rear wall 25, a left side wall 26, a right side wall 27, and a top wall 28. The plate includes through bores 29, 30, 31, 32, 33a and 34. The rear plate 38 is defined by a front wall 39, a rear wall 40, a right side wall 41, a left side wall 42, and a top wall 43. The plate includes through bores 46, 48, 50 and 52.

Located forwardly of the front plate 22 is a front tool holder member 64 and connected thereto by rod brackets 66, 67, and 68. The member has openings 69, 70, 71, and 72 with the rod brackets passing through the first three openings and secured to the member 64 by bolts 73.

The ram 14 is secured to the front wall 39 of the rear plate 38 with the ram drive 16 extending forwardly through bore 32. The ram is hydraulic in operation; may be purchased from Black Hawk Industries, and has a release valve 82 secured to a valve arm 83 which is operated by a solenoid 84. The solenoid is mounted on a cross support 85.

The pump 15 is actuated by an arm 86. An accordian arm 87 is movably received within groove 88a of arm 88b which is connected to an eccentric 88. The other end of arm 87 is pivotally mounted to journal 87a and rotatably pinned to arm 86 at 87b, which will cause arm 86 to move reciprocally during operation. Fluid is fed from the pump into the ram cylinder in the well-known manner. The eccentric is rigidly secured to a jack shaft 90 secured by a pillow block 92 mounted on the cross support 85, and a pillow block 94 on an upper cross support 96. Rigidly mounted on the top of the shaft 90 is a sprocket 98. The sprocket is driven by a roller chain 100, which in turn is driven by a sprocket 102. The sprocket is mounted on a jack shaft 104 secured to the rear wall 40 of the rear plate 38 by pillow blocks (not shown).

Mounted on the jack shaft 104 above the sprocket 102 is a V-pulley 106 driven by a V-belt 107, which in turn is driven by a V-pulley 108. The pulley is secured to shaft 109 of the power means 20.

Mounted forwardly of the front wall 24 of the front plate 22 is a rear tool guide 110 with a through opening 111 aligned with through bore 33a, and through which passes a bolt 112. A spring 33 is secured to the bolt 112 at its forward end and secured through an opening 78 in the rear plate 38 at its rear end. A mount 114 is secured to the guide 110 and maintains the rear tool members in proper position. A threaded opening 116 has a screw 117 located therein which may be adjustably positioned to limit back travel of the guide.

A safety shield 118 is mounted by a hinge 120 to the top wall 28 of the front plate 22. The shield protects the user from flying chain fragments during utilization of the invention.

A chain link guide 122 is rigidly bolted to a bracket 123 which is welded or otherwise attached to the front tool holder member 64. The guide includes a rod 124, and an adjustable slide 125 which may be positioned along the rod and maintained at a particular position by a wing nut 126. The slide has a slot 127 with a hook member 128, actuated by a spring 129, passing therethrough.

Secured to the rear wall 25 of the front plate 22 is a rod 133 having an adjustably positioned slide 131 with a limit switch 132 mounted thereon. Passing through the bore 34 and rigidly secured to the rear tool guide 110 is a rod 134 with an actuator 135, in whose path of travel the switch 132 is located.

The tool utilized comprises a breaking set 138, 139 for case hardened chain, the member 138 having a channel 139a to receive a complementary bifurcated member 138a, and a shearing set 140, 141 for soft chain, the member 140 having a diagonal edge 140a complementarily mating with the diagonal edge 141a of the member 141. There is a set 142, 143 to pry apart the chain hooks, the L-shaped member 143 having a diagonal edge 143a mating with a complementary diagonal edge 142a of the L-shaped member 142, and a set 145, 146 to close the chain hooks, the member 145 having a diagonal edge 145a receivable within a rounded channel 146a of the closure member 146.

In operation the unit 10 is prepared for use by placing either cutting set 138, 139 or 140, 141 in the front tool holder member 64 and rear tool guide 110. The screw 117 is adjusted to limit the back travel of the guide 110, and the slide 131 is firmly positioned on the rod 130 to limit forward travel of the guide 110. The chain link guide 122 is firmly positioned on the rod 130 a distance from the cutting tools equal to the desired length of chain to be cut.

The operator places the desired chain with the end link looped over the hook 128 of the chain link guide 122 with a link positioned in a bed 136 between mount 114 and member 64. The safety shield 118 is lowered into protective position. The power means 20 is actuated by a foot switch (not shown). This causes the interconnecting V-pulleys, V-belts, and sprockets to drive the eccentric 88 and arms 87 and 86. The pump drives the ram drive 16 and the mount 114 forward until contact is made between the cutting tools and the chain. As the pressure increases on the chain, the spring 129 allows the hook 128 to "give," preventing any damage due to snapping of the guide 122. As the chain is cut, the actuator 135 contacts the switch 133, closing a circuit (not shown) containing solenoid 84, causing the valve arm 83 to open the valve 82. With the release of pressure on the ram 14, the rear tool guide 110 is drawn to the rear by spring 33. This procedure is repeated until the desired member of chain lengths have been cut.

The closure tools 145 and 146 are placed in the member 64 and the guide 110. The chain hooks are passed through the end links of the cross chains with the hooked portion positioned around the elongated portions of the side chain links. The assembly is placed in position in the unit 10, the appropriate adjustments, are made, and the hooks are pressed into securement in the same manner as previously described.

To separate worn cross chains the prying tools 142, 143 are placed in the member 64 and the mount 114. Again appropriate adjustments are made, and the chain hooks are pried apart in a similar manner as described above.

The terms and expressions which have been employed here are used as terms of description and not of limitation, and there is no intention, in the use of such terms and expressions, of excluding equivalents of the features shown and described, or portions thereof, it being recognized that various modifications are possible within the scope of the invention claimed.

I claim:
1. A machine for breaking or shearing chain links of interlocking chains, and spreading and compressing chain hooks, comprising:
 (a) a frame,
 (b) a front tool holder attached to the frame,
 (c) a ram drive secured to the frame, located and spaced opposite the front tool holder forming a bed for locating one of the links of chain,
 (d) a mount carried by the ram drive and positioned to be guided into the bed,
 (e) means for limiting the stroke into the bed,
 (f) means on the mount and front tool holder for each removably receiving one of complementary sections of a link shearing or breaking tool, or a chain hook spreading tool, or a chain hook compressing tool whereby the machine may be used selectively for breaking or shearing the links, or spreading or compressing the chain hooks.

2. The invention according to claim 1, the breaking tools including a channel shaped member and a complementary bifuricated member receivable within the channel.

3. The invention according to claim 1, the shearing tools including a T-shaped member having a diagonal edge and a complementary member having a mating diagonal edge.

4. The invention according to claim 1, the spreading tools including an L-shaped member having a diagonal edge and a complementary L-shaped member having a mating diagonal edge.

5. The invention according to claim 1, the compressing tools including a rounded channel shaped member adapted to receive a chain hook and a complementary diagonal edge of a closure member.

References Cited
UNITED STATES PATENTS

| | | | |
|---|---|---|---|
| 1,386,372 | 8/1921 | Singer | 59—7 |
| 3,003,306 | 10/1961 | Quisenberry | 59—7 |
| 3,028,723 | 4/1962 | Kaplan | 59—8 |
| 3,172,250 | 3/1965 | Eastep | 59—7 |
| 3,173,327 | 3/1965 | Rupp | 83—639 |
| 3,224,310 | 12/1965 | Bieri | 83—308 |

CHARLES W. LANHAM, *Primary Examiner.*

G. P. CROSBY, *Assistant Examiner.*

U.S. Cl. X.R.

83—308, 639